United States Patent [19]

Clarke

[11] 4,112,340

[45] Sep. 5, 1978

[54] CONTROL DEVICES

[75] Inventor: Graham John Clarke, St. Albans, England

[73] Assignee: Marconi Instruments Limited, England

[21] Appl. No.: 778,256

[22] Filed: Mar. 16, 1977

[51] Int. Cl.² .................................................. H02K 27/20
[52] U.S. Cl. .................................................. 318/331
[58] Field of Search ........ 318/331, 317, 347, 345 AB, 318/345 CA, 343, 457

[56] References Cited

U.S. PATENT DOCUMENTS 3,488,756  1/1970  Skrivanek, Jr. ..................... 318/331

Primary Examiner—Herman Hohauser

[57] ABSTRACT

A manually rotatable control knob is coupled to a d.c. ironless motor which maintains rotation of the knob once it is initially spun by hand. The initial back e.m.f. of the motor is sensed and is used via a feedback loop having a particular time constant to determine the subsequent rotational speed of the knob. By correctly profiling the time constant the inertial effect of a heavy flywheel can be simulated.

11 Claims, 1 Drawing Figure

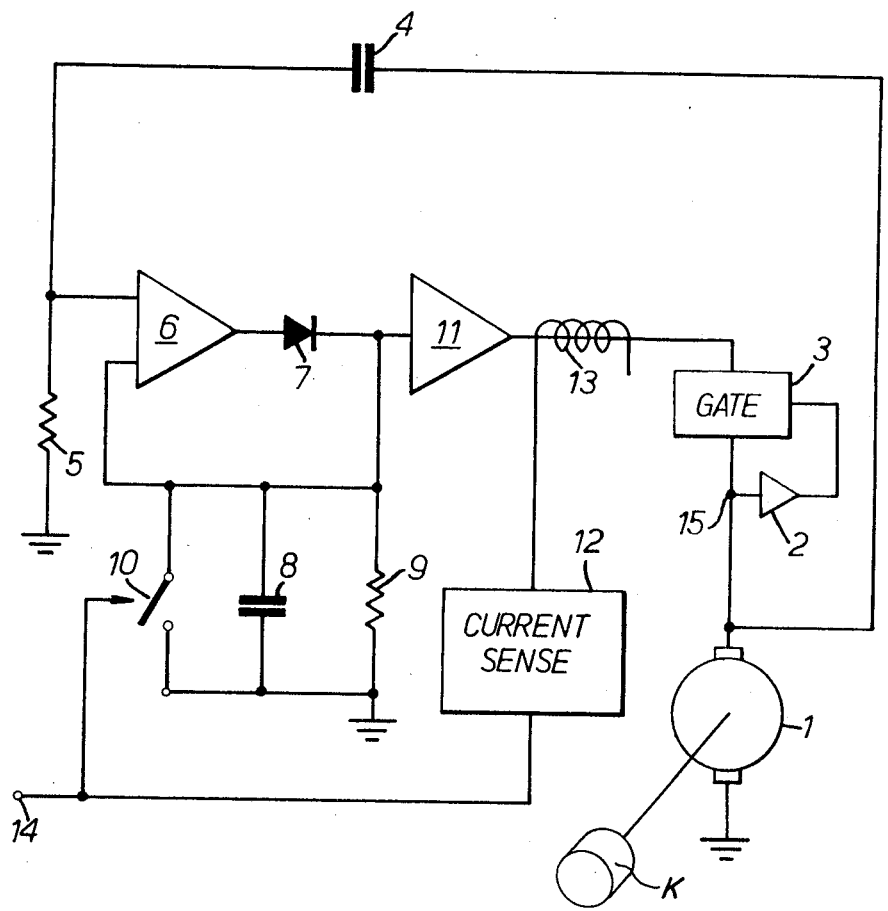

CONTROL DEVICES

This invention relates to control devices of the kind intended for use with electronic or electrical apparatus. For some applications it is required to rotate a manually operable control knob through many turns, and hitherto some control devices have been provided with flywheels so that when the control knob is spun quickly it continues to rotate for some time. Such flywheel arrangements can become tiring to use because of the high inertia of the flywheel, and in order to provide an acceptable 'feel' to an operator such mechanical arrangements can be expensive to provide, and moreover can be unduly bulky and heavy when incorporated in compact apparatus.

According to this invention, a control device suitable for an electronic apparatus includes means whereby rotation can be imparted to a rotational member which is coupled to a d.c. ironless motor, means for obtaining from the back e.m.f. generated by the motor when it is turned a driving signal which is used to continue the rotation of the rotatable member to simulate an inertial effect.

Preferably, a manually operable knob is provided for imparting rotational motion to the d.c. ironless motor.

Preferably, a derived signal is produced which is related to the initial speed of the motor, and which signal is used to produce the driving signal.

Preferably, the derived signal is stored in a storage system having a long time constant.

Preferably again, the storage system comprises a capacitor connected in the closed feedback path of a differential amlifier, the time constant of the storage system being dictated by the resistance of a capacitor shunt path.

The invention is further described, by way of example, with reference to the accompanying drawing which illustrates in diagrammatic form part of a control device in accordance with the present invention.

Referring to the drawing, the control device consists of a d.c. ironless motor 1 mechanically coupled to a manually rotatable knob k. One such d.c. ironless motor is that available under the name and type reference Philips - 9904-120-12601. In practice both motor and knob would conveniently be mounted on a common shaft. The knob can be turned both clockwise and anticlockwise, but for simplicity of illustration only the circuitry relating to the clockwise rotation is shown — a similar set of circuitry for the anti-clockwise rotation would in practice be provided.

The motor 1, when turned by the knob, generates a back e.m.f. which is sensed by the high gain amplifier 2 which opens gate 3. The motor 1 is connected via a capacitor 4 to a resistor 5 and one input terminal of a differential amplifier 6. When the motor 1 is rotated a voltage is produced across resistor 5 which is proportional to the build-up of back e.m.f. on the motor, and hence is proportional to the initial speed. This voltage is fed to the amplifier 6 and passed via a diode 7 to charge a capacitor 8. A high value resistor 9 and a discharge switch 10 are connected in parallel with the capacitor 8. Diode 7 is poled such that capacitor 8 stores the peak value of the amplified voltage, the value of which slowly decays as capacitor 8 discharges through resistor 9.

A further amplifier 11 applies this voltage via the open gate 3 to the motor 1 to drive it at a speed proportional to the voltage stored on capacitor 8.

It will be appreciated that once the motor 1 has been given manually an initial spin it continues to be driven until the charge on capacitor 8 decays away. By using a very high valued resistor 9, or by omitting resistor 9 altogether, the decay time can be made very long indeed, so that the motor continues to spin until it is stopped manually.

When the motor 1 is stopped manually the back e.m.f. momentarily reverses and a very large current is passed to the motor from amplifier 11. This momentary increase in current is detected by a current sensor 12 which is coupled into the output lead of amplifier 11 by a detector 13 conventionally shown as a short coil. The increase in current is used by the sensor 12 to close switch 10, and thereby discharge capacitor 8, and the motor receives no further drive voltage from amplifier 11.

As an additional refinement, the current sense circuit 12 can be arranged to discharge the capacitor 8 in increments when the detector 13 detects an increase in motor current. This means that when the motor 1 is slowed manually (but not stopped) the capacitor 8 is not completely discharged. The drive signal to the motor 1 from the amplifier 11 is reduced to a level which drives the motor at a correspondingly slower speed. This modification is desirable since the control circuit would give to an operator the impression of unnatural operation if the rotation of the knob stops abruptly when the intention is merely to slow it down from a fast spin.

The motor may be stopped remotely by applying a signal to the terminal 14, to close switch 10. Although shown as a simple mechanical switch 10, in practice an electronic switch such as a transistor, would be used instead.

The circuit shown in the drawing relates only to clockwise rotation of the motor 1. When the motor is turned anticlockwise, a back e.m.f. of reversed polarity is produced and this is detected by another amplifier (not shown) also connected to terminal 15. This other amplifier feeds a circuit which is essentially similar to that illustrated.

If desired a small delay can be introduced into the circuit loop containing the amplifier 2 and the gate 3. This gives an operator time to release the knob when spinning before the control circuit takes over. A suitable delay is about 0.3 seconds.

By choosing the values of capacitor 8 and resistor 9 the apparent inertial properties of the control device can be tailored to particular requirements. A d.c. ironless motor has a very smooth feel to it when rotated manually, and such a control device is well suited for use with quality equipment where expensive and cumbersome mechanical systems have previously been used.

Conveniently the control device can be used to produce a digital control signal directly in a manner referred to in our copending Patent Application Ser. No. 778,257, filed Mar. 16, 1977.

I claim:

1. A control device suitable for an electronic apparatus including means whereby rotation can be imparted to a rotational member which is coupled to a d.c. ironless motor, means for obtaining from the back e.m.f. generated by the motor when it is turned a driving signal which is used to continue the rotation of the rotatable member to simulate an inertial effect.

2. A control device as claimed in claim 1 and wherein a manually operable knob is provided for imparting rotational motion to the d.c. ironless motor.

3. A control device as claimed in claim 1 and wherein a derived signal is produced which is related to the initial speed of the motor, and which signal is used to produce the driving signal.

4. A control device as claimed in claim 3 and wherein the derived signal is stored in a storage system having a long time constant.

5. A control device as claimed in claim 4 and wherein the storage system comprises a capacitor connected in the closed feedback path of a differential amplifier, the time constant of the storage system being dictated by the resistance of a capacitor shunt path.

6. A control device comprising, in combination:
- a d.c. ironless motor having a rotatable member which generates a back e.m.f. when rotated;
- a control member connected to said rotatable member;
- storage means connected to the back e.m.f. generated by said motor for storing a signal whose amplitude is related to rotational speed imparted to said control member; and
- driving circuit means connect to said storage means and to said motor for rotating said rotatable member in accord with the amplitude of the signal stored by said storage means whereby rotation of said rotatable member initially imparted by said control member is continued by said driving circuit means.

7. A control device as defined in claim 6 wherein said storage means includes a capacitor which stores said signal and a resistor in shunt with said capacitor whereby the amplitude of said signal decays with time.

8. A control device as defined in claim 7 including sensing means for discharging said capacitor when said rotatable member is stopped by said control member.

9. A control device comprising, in combination:
- a d.c. ironless motor having a rotatable member which generates a back e.m.f. when rotated;
- a control member connected to said rotatable member to impart initial rotation thereto under operator control;
- storage means connected to the back e.m.f. generated by said motor for storing a signal whose amplitude is related to rotational speed imparted to said control member by an operator;
- driving circuit means connected to said storage means for producing a driving signal in accord with the amplitude of the stored signal; and
- gate means responsive to generated back e.m.f. for connecting said driving signal to said motor whereby said rotatable member is continued in its rotation as imparted by said control member.

10. A control device as defined in claim 9 wherein said storage means includes a capacitor which stores said signal and a resistor in shunt with said capacitor whereby the amplitude of said signal decays with time.

11. A control device as defined in claim 10 including sensing means for discharging said capacitor when said rotatable member is stopped by said control member.

* * * * *

UNITED STATES PATENT AND TRADEMARK OFFICE
CERTIFICATE OF CORRECTION

PATENT NO. : 4,112,340
DATED : September 5, 1978
INVENTOR(S) : Graham John Clarke It is certified that error appears in the above-identified patent and that said Letters Patent are hereby corrected as shown below:

On the title page, insert:

---[30] Foreign Application Priority Data

Great Britain application 10890/76 filed March 16, 1976.---

Signed and Sealed this

Seventeenth Day of April 1979

[SEAL]

Attest:

RUTH C. MASON
Attesting Officer

DONALD W. BANNER
Commissioner of Patents and Trademarks